US006115677A

United States Patent [19]

Perthold et al.

[11] Patent Number: 6,115,677

[45] Date of Patent: Sep. 5, 2000

[54] CONSUMPTION MEASUREMENT SYSTEM FOR REMOTE READING

[75] Inventors: Rainer Perthold, Erlangen; Heinz Gerhaüser, Waischenfeld, both of Germany

[73] Assignee: Fraunhofer-Gesellschaft zur Föderung der angewandten Forschung e.V., München, Germany

[21] Appl. No.: 09/043,586

[22] PCT Filed: Sep. 17, 1996

[86] PCT No.: PCT/EP96/04068

§ 371 Date: Mar. 20, 1998

§ 102(e) Date: Mar. 20, 1998

[87] PCT Pub. No.: WO97/11445

PCT Pub. Date: Mar. 27, 1997

[30] Foreign Application Priority Data

| | | | |
|---|---|---|---|
| Sep. 20, 1995 | [DE] | Germany | 195 34 969 |
| Jun. 18, 1996 | [DE] | Germany | 196 24 273 |

[51] Int. Cl.[7] .......... H04Q 11/00

[52] U.S. Cl. .......... 702/62; 340/870.02

[58] Field of Search .......... 702/62; 705/22, 705/28; 343/700 MS; 340/870.01, 870.02; 342/350, 359

[56] References Cited

U.S. PATENT DOCUMENTS

| | | | |
|---|---|---|---|
| 5,111,407 | 5/1992 | Galpern | 364/483 |
| 5,181,025 | 1/1993 | Ferguson et al. | 340/870.21 |
| 5,434,579 | 7/1995 | Kagoshima et al. | 343/700 |
| 5,832,372 | 11/1998 | Clelland et al. | 455/115 |
| 5,856,791 | 1/1999 | Gray et al. | 340/870.02 |

FOREIGN PATENT DOCUMENTS

| | | | |
|---|---|---|---|
| 0 684 659 A1 | 11/1995 | European Pat. Off. | H01Q 1/22 |
| 94 05 793 U | 10/1994 | Germany | G08C 17/00 |
| 1310572 | 12/1989 | Japan | H01L 25/00 |
| 2-131001 | 5/1990 | Japan | H01Q 13/70 |
| 6303163 | 10/1994 | Japan | H04B 1/38 |
| 2 268 032 | 12/1993 | United Kingdom | G08C 17/00 |
| WO 93/04451 | 3/1993 | WIPO | G08C 17/00 |

*Primary Examiner*—Timothy P. Callahan
*Assistant Examiner*—Linh Nguyen
*Attorney, Agent, or Firm*—Duft, Graziano & Forest, P.C.

[57] ABSTRACT

A consumption recording system affixed to a wall comprises a consumption recording device and a radio module, which is connected to the consumption recording device. A microstrip antenna is connected to the radio module. The microstrip antenna is placed within a non-metallic casing cover of the consumption recording device in such a way that the main radiation direction of the microstrip antenna is directed perpendicularly away from the wall.

6 Claims, 2 Drawing Sheets

CONSUMPTION MEASUREMENT SYSTEM FOR REMOTE READING

BACKGROUND OF THE INVENTION

1. Field of the Invention

The present invention relates to consumption recording systems with remote reading and in particular to consumption recording systems in which planar antennas are used to radiate a signal corresponding to a measured consumption.

2. Description of Prior Art

In blocks of flats or office blocks with a central energy and water supply, it is necessary to record the individual consumption of each and every tenant as regards gas, heating and/or water, as separate items, and to charge accordingly. In view of the rising cost of energy and water and also the very different consumption rates of individual tenants, e.g. singles as compared with families with children, it is no longer supportable to deduct the energy and water costs by a "rule of thumb" based on the rented domestic or business area.

This has led to the provision of a separate meter for electrical energy for each tenant or proprietor, all the meters then being normally located in a common room, e.g. in the cellar of the house concerned. In order to read the consumption data for electrical current, a municipal works employee must take the meter readings at regular intervals, which is not too time consuming since all the house's current meters are located in a common room.

The situation is different, however, in the case of central gas supplies or central heating systems for blocks of flats and office buildings. The system is here usually supplied through a central burner unit, so that it is necessary to affix a heating meter to e.g. each radiator. The situation is similar for a gas supply. Here a gas meter is provided at the entry point of the gas network into the respective flat. In order to record the consumption and to produce a bill, it follows that an employee of the utility company must enter every flat, e.g. to take the gas reading, whereas in the case of heating meters on heaters it is even necessary for the employee of the utility company to seek out each single radiator and each warm water pipe so as to note down the corresponding meter reading in order to provide a complete bill for each residential unit. In view of the great amount of time needed to enter every single flat of a block of flats or even every single room of a flat, reading is very expensive and time consuming. The reading costs may even be of the same order as the total incurred heating costs.

In view of the situation described, efforts are being made to implement a reading of the cited consumption recording devices using wireless telemetry. The linear antennas used hitherto as transmitting/receiving antennas for this purpose, such as e.g. dipole antennas, vertical antennas or loop antennas, suffer, however, from the disadvantage that it is extremely difficult to meet the demands made on wireless consumption recording systems with the cited antenna types. In particular, these demands consist of an adequate transmitting or receiving efficiency and adequate security against destruction and impairment through the environment.

The electrical properties of the cited antenna types change dramatically as soon as conductive material, such as e.g the casing of the meter, comes near the radiating component. Persons skilled in the art also call this the "proximity effect". Thus a vertical antenna e.g. only functions satisfactorily if it is located on the outside of the meter casing, the casing serving thereby as HF counterpoise. With this setup the antenna is accessible from outside and can be damaged very easily.

Furthermore, the wall mounting of such devices presents a fundamental problem because a vertical antenna thereby always finds itself close to the HF-disturbing wall of the house, which may be made of reinforced concrete e.g., or near to a metal radiator or gas meter. The same is true for dipole antennas, since these cannot be mounted sufficiently far from the wall of the house or the radiator. The mounting location also has the consequence that an omnidirectional radiation characteristic of the transmitting/receiving antenna does not necessarily make sense, since electrical energy is radiated unprofitably into the wall, which is fundamentally subject to losses. The linear polarization of the electromagnetic field that the cited antennas radiate also has a disturbing effect since reflections of the electromagnetic radiation are accompanied by rotations of the plane of polarization of the radiation which lead to a reduced receiving power at the input of the receiver.

SUMMARY OF THE INVENTION

It is the object of the present invention to provide a reliable wireless consumption recording system.

This object is achieved by a consumption recording system affixed to a wall comprising:

a consumption recording device;

a radio module, which is connected to the consumption recording device; and a microstrip antenna, which is connected to the radio module, where the microstrip antenna is placed within a non-metallic casing cover of the consumption recording device in such a way that the main radiation direction of the microstrip antenna is directed perpendicularly away from the wall.

The invention is based on the finding that, by using a planar antenna in a consumption recording system, it is possible to eliminate the disadvantages present in the prior art. In particular, the present invention makes it possible to place the antenna in a consumption recording system in such a way that the antenna is protected against destruction and manipulation. A further advantage of the present invention is that the metal casing of a consumption recording device does not adversely affect the radiation characteristic of the planar antenna but, in the sense of better HF radiation, positively; in addition the radiation characteristic is directed away from the wall. Because of the fact that the radiation from the planar antenna used in the invention is elliptically polarized, reflections along the radio link cause much smaller power losses at the receiver than in the case of linear radiators. Finally, the antenna which is used is relatively insensitive as regards the exact mounting position and the quality of the connection of the HF ground of the transmitter with the metallic casing of the meter, which means that the position of the antenna is not a particular consideration in the design of a consumption recording device, and on the other hand that there are no problems in incorporating the antenna subsequently.

BRIEF DESCRIPTION OF THE DRAWINGS

Preferred embodiments of the present invention will now be described in more detail, making reference to the enclosed drawings in which.

DESCRIPTION OF PREFERRED EMBODIMENTS OF THE INVENTION

Figure 1:
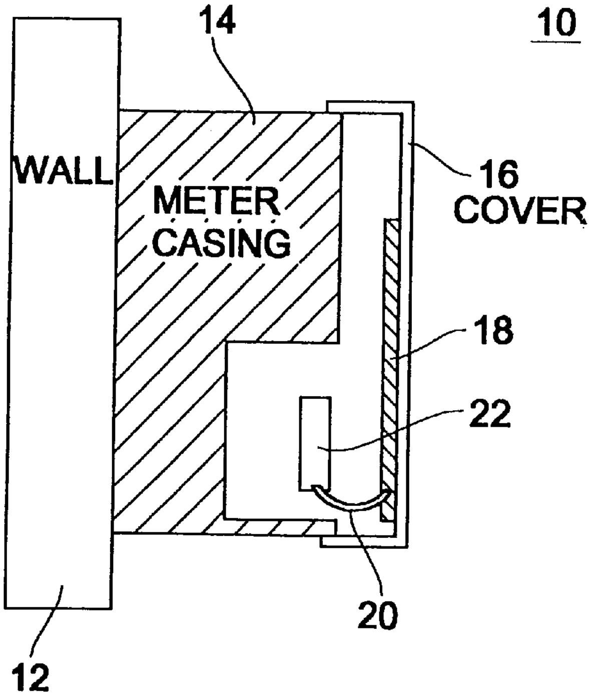
FIG. 1 shows a consumption recording system according to an embodiment of the present invention taking a gas meter as an example.

FIG. 1 shows a consumption recording system 10 affixed to a wall 12. An embodiment of the present invention will be described in terms of a gas meter. It is, however, clear that the consumption recording system according to the present invention can equally well be a water meter, a heating meter and similar. A metallic gas meter casing 14 is terminated by a plastic casing cover 16 on the side opposite the wall 12. The casing cover 16 is normally provided with a lead seal to prevent unauthorized manipulations of the gas meter. A planar antenna 18 is affixed to the casing cover 16 with glue or other suitable holding devices. The planar antenna 18 is fed from a radio module 22 via a coaxial line 20. The radio module is in contact with a gas meter device (not shown) so as to process suitably the recorded gas meter reading and to convert it into data signals which can be transmitted via the planar antenna 18. The gas meter device is contained in the gas meter casing 14. It is obvious to persons skilled in the art that any other consumption recording device can be connected to the radio module 22 so that this can provide the planar antenna 18 with suitable transmission data via the coaxial cable.

Figure 2:
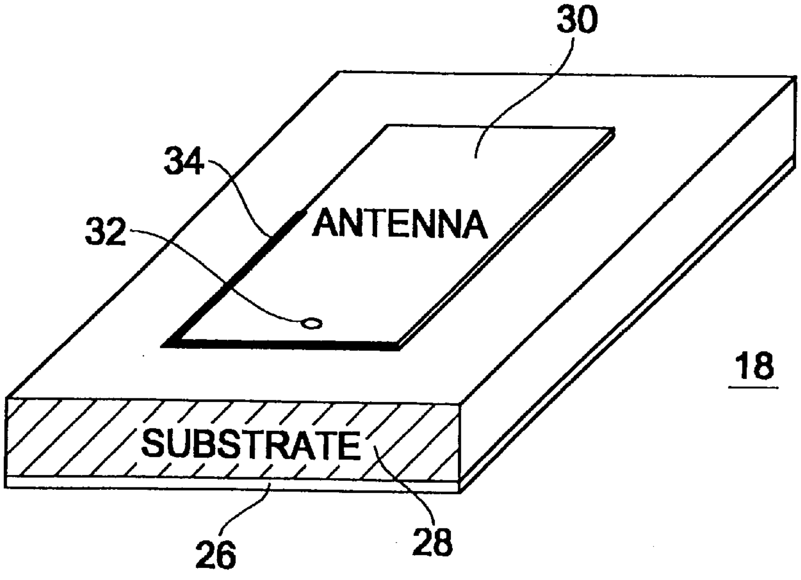
FIG. 2 shows an "inverted-F-antenna" which can be used as planar antenna in the consumption recording system according to the present invention.

FIG. 2 shows a planar antenna 18, which is implemented as an "inverted-F-antenna", which is used in a preferred embodiment of the present invention. Antennas of this type are described by K. Hirasawa and M. Haiischi in "Analysis, Design, and Measurement of small and low Profile Antennas", Artech House, Boston, London, 1992. In essence, planar antennas can be conceived as microstrip resonators with radiation losses, where the radiation losses of the resonator represent the radiated useful signal.

The "inverted-F-antenna" 18 comprises the following components: the dielectric antenna substrate 28, such as e.g. FR4, is provided on a metallized base area 26. A metallized antenna area 30 is formed on the antenna substrate using e.g. known etching methods.

Depending on the field distribution on the antenna area 30, a feed-in point 32 can be chosen to match the antenna 18 to the output impedance of a transmitter in the radio module 22. The antenna 18 is tuned to resonance at the desired transmitting frequency, such as e.g. 433 Mhz, by adjusting the length of a short-circuit strip 34.

Figure 3:
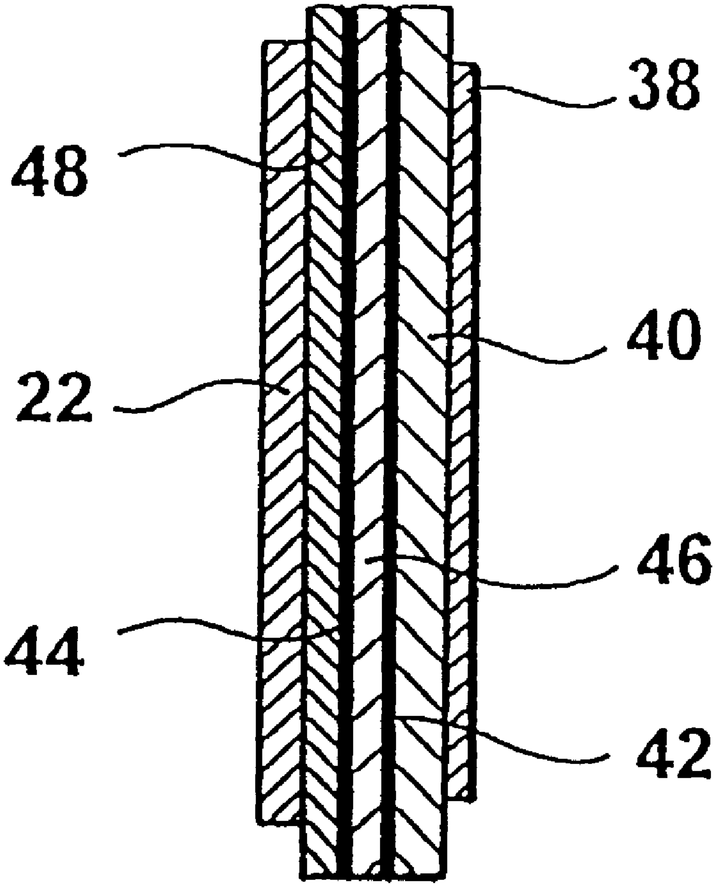
FIG. 3 shows a radio module with a planar antenna on a multilayer substrate for a consumption recording system according to the present invention.

Another embodiment of the consumption recording system according to the present invention is shown in FIG. 3. In particular, a metallized area 38, which functions as antenna area, is here affixed to a multilayer substrate 40. A first ground area 42 forms the necessary ground level for the planar antenna. Between the first ground area 42 and a second ground area 44 there is an intermediate substrate 46, which can be of the same material as a circuit substrate 48 on which there is in turn a radio module 22. The radio module 22 may incorporate SMD components for a high-frequency section and/or low-frequency circuit arrangements which are needed for the signal processing of the consumption recording device.

When the time comes to read the consumption recording device, an agent of the utility company activates all the consumption recording devices in a block of flats out of a standby mode, e.g. by transmitting an activation pulse, whereupon said devices start to transmit their meter reading with a code which is different for each individual consumption recording device. A suitable receiver then assigns the received signals to the respective tenant and produces the corresponding consumption bills. It is thus no longer necessary to enter each flat or each single room of each flat.

The planar antenna 18 which is used in the consumption recording system 10 according to the present invention is a planar structure, so that only a little mounting height but a sufficiently large area must be available. The antenna can thus be accommodated in a casing which is affixed in any way whatever, e.g. in a gas meter or radiator mounted on a wall. The main radiation direction points forwards from the gas meter, i.e. away from the wall, which is subject to losses, which consequently results in an increased range of the whole system. The antenna also does not react very sensitively to changes in the environment behind the antenna, i.e. to changes in the mechanical position in the gas meter. The antenna can also be produced easily by a conventional etching process. The HF radiation field of the antenna is elliptically polarized, so that no large polarization losses occur at the receiver if reflections on the radio link cause phase rotations. Since the antenna already possesses an inherent reference level, the quality of the ground connection to the gas meter is of little importance. It is, however, also possible, with suitable connection of the antenna to the metal casing of a consumption recording device 14, to use the metallic casing as ground level for the planar antenna 18.

What is claimed is:

1. A consumption recording system affixed to a wall comprising:

a consumption recording device;

a radio module, which is connected to the consumption recording device; and a microstrip antenna, which is connected to the radio module, where the microstrip antenna is placed within a non-metallic casing cover of the consumption recording device in such a way that the main radiation direction of the microstrip antenna is directed perpendicularly away from the wall, wherein a metal area of the consumption recording device represents the ground area of the microstrip antenna.

2. A consumption recording system according to claim 1 wherein the microstrip antenna is an inverted-F-antenna.

3. A consumption recording system according to claim 1 wherein the consumption recording device is a gas meter.

4. A consumption recording system affixed to a wall comprising:

a consumption recording device;

a radio module, which is connected to the consumption recording device; and a microstrip antenna, which is connected to the radio module, where the microstrip antenna is placed within a non-metallic casing cover of the consumption recording device in such a way that the main radiation direction of the microstrip antenna is directed perpendicularly away from the wall, wherein the microstrip antenna has its own ground area, and wherein the radio module and the microstrip antenna are implemented on the same substrate.

5. A consumption recording system according to claim 4 wherein the consumption recording device is a gas meter.

6. A consumption recording system according to claim 4 wherein the microstrip antenna is an inverted-F-antenna.

* * * * *